US012646650B2

(12) United States Patent
Negri

(10) Patent No.: US 12,646,650 B2
(45) Date of Patent: Jun. 2, 2026

(54) INSTRUMENT TRANSFORMER AND METHOD TO ISOLATE PARTS

(71) Applicant: HSP HOCHSPANNUNGSGERÄTE GMBH, Troisdorf (DE)

(72) Inventor: Fabrizio Negri, Nuremberg (DE)

(73) Assignee: HSP Hochspannungsgeräte GMBH, Troisdorf (DE)

( * ) Notice: Subject to any disclaimer, the term of this patent is extended or adjusted under 35 U.S.C. 154(b) by 1179 days.

(21) Appl. No.: 17/626,584

(22) PCT Filed: Jun. 12, 2020

(86) PCT No.: PCT/EP2020/066301
§ 371 (c)(1),
(2) Date: Jan. 12, 2022

(87) PCT Pub. No.: WO2021/008787
PCT Pub. Date: Jan. 21, 2021

(65) Prior Publication Data
US 2022/0262560 A1 Aug. 18, 2022

(30) Foreign Application Priority Data
Jul. 12, 2019 (EP) .................................... 19186056

(51) Int. Cl.

| | |
|---|---|
| ***H01F 27/32*** | (2006.01) |
| ***H01B 3/47*** | (2006.01) |
| ***H01F 38/26*** | (2006.01) |
| ***H01F 38/36*** | (2006.01) |
| ***H01F 41/12*** | (2006.01) |

(52) U.S. Cl.
CPC ............. *H01F 27/324* (2013.01); *H01B 3/47* (2013.01); *H01F 38/26* (2013.01); *H01F 38/36* (2013.01); *H01F 41/125* (2013.01)

(58) Field of Classification Search
CPC ........ H01F 27/324; H01F 38/26; H01F 38/36; H01F 41/125; H01B 3/47
See application file for complete search history.

(56) References Cited

U.S. PATENT DOCUMENTS 3,953,815 A * 4/1976 Raupach ................ H01F 38/26
336/107
5,391,835 A 2/1995 Yao et al.
(Continued)

FOREIGN PATENT DOCUMENTS

CN 102057454 A 5/2011
CN 105229760 A * 1/2016 ........... H01F 27/327
(Continued)

*Primary Examiner* — Malcolm Barnes
(74) *Attorney, Agent, or Firm* — Laurence A. Greenberg; Werner H. Stemer; Ralph E. Locher

(57) ABSTRACT

An instrument transformer for high current and/or high voltage conversion includes a housing and at least an active part, which is electrically insulated by an isolation material. The isolation material includes or is a paste and/or pulp. A method for producing the instrument transformer includes the filling of a housing of the instrument transformer with paste and/or pulp, particularly with paste and/or pulp including paper material and/or cellulose, solved in a solvent, particularly at least one ionic liquid.

19 Claims, 2 Drawing Sheets

(56) References Cited

U.S. PATENT DOCUMENTS

| | | | | |
|---|---|---|---|---|
| 6,980,076 | B1 * | 12/2005 | Rolling | H01B 3/52 174/124 R |
| 7,808,360 | B1 * | 10/2010 | Le | H01F 27/022 336/198 |
| 2005/0072964 | A1 * | 4/2005 | Rapp | H01B 3/22 252/570 |
| 2016/0343465 | A1 | 11/2016 | Turpin et al. | |
| 2019/0198241 | A1 * | 6/2019 | Banaszczyk | H01F 27/29 |
| 2020/0388437 | A1 * | 12/2020 | Calamari | H01F 27/06 |

FOREIGN PATENT DOCUMENTS

| | | | | |
|---|---|---|---|---|
| CN | 105934801 | A | 9/2016 | |
| DE | 2356988 | A1 | 5/1975 | |
| EP | 1297540 | A1 | 4/2003 | |
| EP | 2800112 | A1 * | 11/2014 | H01F 38/30 |
| WO | WO-2009146569 | A1 * | 12/2009 | H01F 38/20 |

* cited by examiner

INSTRUMENT TRANSFORMER AND METHOD TO ISOLATE PARTS

FIELD AND BACKGROUND OF THE INVENTION

The present invention relates to an instrument transformer and a method, for high current and/or high voltage conversion, comprising a housing and at least an active part, which is electrically insulated by an isolation material.

Oil insulated instrument respectively measurement transformers are for example known from U.S. Pat. No. 5,391,835 A. The instrument transformers are used to measure high currents and/or voltages, particularly in the range up to some hundred Ampere and/or up to 1200 kV. An instrument transformer comprises a housing and at least an active part, which includes a measuring assembly. The measuring assembly comprises for example windings arranged around an electric conductor, which can be used to measure a current in the conductor by magnetic induction in the windings. The active part is electrically insulated by an isolation material from the housing of the instrument transformer. The whole measuring assembly or parts of the measuring assembly are wrapped by kraft paper sheets and the housing is filled by oil, to electrically insulate active parts.

An insulation of the measuring assembly by kraft paper, particularly paper tape respectively paper sheets, is carried out by manually taping the measuring assembly. A manual taping procedure takes much time, is expensive due to manpower costs and suffers from human errors. Due to complex shapes of parts of the measuring assembly, an automation of taping procedures is difficult and expensive.

SUMMARY OF THE INVENTION

An object of the present invention is to overcome the problems described above. Especially an object of the present invention is to describe a method to insulate parts of an instrument transformer and an instrument transformer with electrically insulated parts, with an easy to produce and cost-effective insulation.

The above objects are achieved by an instrument transformer for high current and/or high voltage conversion and/or by a method for an instrument transformer, particularly for an instrument transformer described above.

An instrument transformer for high current and/or high voltage conversion according to the present invention comprises a housing and at least an active part, which is electrically insulated by an isolation material. The isolation material comprises or is a paste and/or pulp.

A paste and/or pulp is easy to handle, especially easy to fill in a housing for example by a machine. The use of isolation material being or at least comprising a paste and/or pulp enables an automation of production, saves costs and is easy to perform, with no or little fault probability. There is no manual taping procedure needed to isolate the measuring assembly, where taping cannot be fully automated, is costly, time consuming and not easy to perform. The human contribution during a manufacturing process can be reduced, introducing automated respectively fully automated filling processes, leading to cost, time and fault reductions.

The paste and/or pulp can comprise a solvent with solved particles, particularly powder of more than 80% wt. partly and/or fully dissolved in less than 20% wt. solvent. A relatively high share of particles and small share of solvent results in good electrical properties, that is a good isolation property, by keeping the paste and/or pulp good manageable during production, particularly during filling in a housing for example by a machine, reducing manufacturing time and costs.

The paste and/or pulp can comprise particles with a size in the range of micro- and/or nano-meter, partly and/or fully dissolved in solvent. This small size gives good dissolution properties and results in a good handling with advantages as described before. A high fill factor is possible, with little amount of space between particles, easy to be produced of for example paper material and/or cellulose, easy to fill into a housing, particularly fully automated.

The particles can be in spherical form, and/or particles can be in fibrous form. Both forms enable a high surface to volume ratio with advantages as described before. Spherical particles are easy to produce, with low cost and easy to handle. Fibrous particles give additional stability and are especially used in the paper industry, with special properties after a drying process like good linkage of particles and directional properties.

Paste and/or pulp can comprise paper material, and/or cellulose, and/or silicon. Paper material, cellulose and/or silicon are good isolation materials, especially at high voltages up to 1200 kV, are environment friendly, cost-effective and easy to handle. Particles of paper material, cellulose, and/or silicon can be easy handled fully automated and are easy to produce in specific sizes.

Paste and/or pulp can comprise as solvent at least one ionic liquid, particularly 1-butyl-3-methylimidazolium chloride [$C_4$mim]Cl, N-methylmorpholine oxide (NMMO), N,N-dimethylacetamide/lithium chloride (DMAc/LiCl), 1,3-dimethyl-2-imidazolidinone/lithium chloride (DMI/LiCl), N,N-dimethylformamide/nitrous tetroxide (DMF/N2O4), dimethyl sulfoxide (DMSO)/tetrabutyl-ammonium fluoride (TBAF), imidazolium phosphates and/or phosphonates, particularly [$C_2$mim]$(MeO)_2PO_2$, [$C_2$mim]-(MeO)$MePO_2$, and [$C_2$mim](MeO)$HPO_2$, 1-butyl-3-methylimidazolium acetate [$C_4$mim]OAc, 1-ethyl-3-methylimidazolium acetate [C2mim]OAc, 1-(3,6,9-trioxadecyl)-3-ethylimidazolium acetate [Me(OEt) 3-Et-Im]OAc, and/or molten salt hydrates, particularly $LiClO_4 \cdot 3H_2O$ and/or $LiSCN \cdot 2H_2O$. These liquids are able to solve or partly or fully dissolve particles, particularly paper material, and/or cellulose, and/or silicon, with advantages as described before.

Paste and/or pulp comprises as insulating fluid oil, particularly mineral oil and/or synthetic oil, and/or ester, particularly vegetable esters. Oil as insulating fluid as part of the paste and/or pulp is a good isolation material, especially at high voltages up to 1200 kV.

The portion of solvent in the paste and/or pulp can be reduced and/or exchanged by insulating fluid. The insulating properties in the paste and/or pulp can be increased by reducing and/or exchanging solvent by insulating fluid.

The paste and/or pulp can be in form of or comprise a gel. Gel is easy to handle, good to produce and allows an automated respectively fully automated filling process, leading to cost, time and fault reductions.

The isolation material with paste and/or pulp can be arranged in the housing, particularly the head housing and/or isolator and/or base, particularly arranged between the housing and active parts, particularly the measuring assembly and the housing. Free space can be filled easy, automatically and cost effective particularly completely with a paste and/or pulp, resulting in a good electrical isolation of parts and/or between parts of the instrument transformer, especially at high voltages up to 1200 kV.

The isolation material with paste and/or pulp can fill in, particularly can completely fill in space between the housing, particularly the head housing and/or isolator and/or base, and active parts, particularly the measuring assembly, with advantages as described before.

A method for an instrument transformer, particularly for an instrument transformer as described before, comprises that a housing of the instrument transformer is filled with paste and/or pulp, particularly with paste and/or pulp comprising paper material and/or cellulose, solved in a solvent, particularly at least one ionic liquid.

The portion of solvent in the paste and/or pulp can be reduced and/or solvent in the paste and/or pulp can be exchanged by an insulating fluid, particularly oil, particularly mineral oil and/or synthetic oil, and/or ester, particularly vegetable esters.

Isolation material, particularly paste and/or pulp, can be filled into the instrument transformer housing, particularly after degassing.

Isolation material, particularly paste and/or pulp, in the housing of the instrument transformer can electrically insulate active parts of the instrument transformer, particularly the measuring assembly, from the housing of the instrument transformer.

The advantages in connection with the described method for an instrument transformer according to the present invention are similar to the previously, in connection with the instrument transformer for high current and/or high voltage conversion described advantages.

The present invention is further described hereinafter with reference to illustrated embodiments shown in the accompanying drawings.

DETAILED DESCRIPTION OF THE INVENTION

Figure 1:
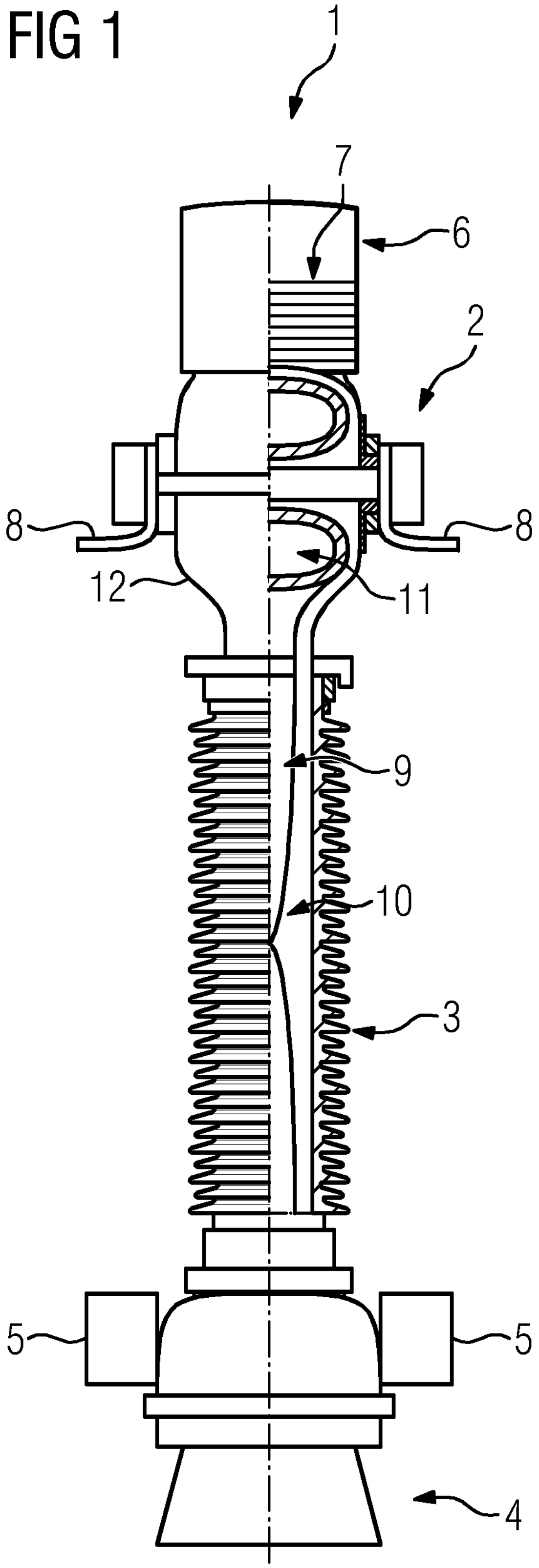
FIG. 1 illustrates an instrument transformer 1 for high current and/or high voltage conversion in section view, comprising a housing and at least an active part, which is electrically insulated by an isolation material 9.

In FIG. 1 is in section view an instrument transformer 1 for high current and/or high voltage conversion shown. The instrument transformer 1 comprises a housing and at least an active part, which is electrically insulated by an isolation material 9. In the embodiment of FIG. 1 an active part of the instrument transformer 1 includes a measuring assembly 11 with for example windings arranged around an electric conductor. The windings can be used to measure a current in the conductor by magnetic induction in the windings. Further active parts are for example control electrodes and/or a discharge pipe.

The active part, particularly the measuring assembly 11, is located within the housing of the instrument transformer 1. The instrument transformer 1 for example comprises a head 2, an isolator 3 and a base 4, which are particularly assembled by a head housing 12 with bellow cover 6, including an oil level indicator 7, by an isolator 3 particularly composed of a hollow cylindrical body and by a base 4 for example in form of a cast-iron pedestal. The isolator 3 is for example a ceramic, silicon and/or composite hollow body with plate fins at the outer sheath to increase leakage current length.

The isolator 3 is for example columnar with two ends of the column, arranged with the base 4 on one end and the head 2 on the other end. The head 2 is on top of the upstanding columnar isolator 3, comprising high voltage terminals 8 to electrically connect the instrument transformer 1 with high voltage lines, electrical generators and/or electrical consumers, to measure current/voltage of electrical high voltage lines and/or devices. A measuring assembly 11 as active part within the housing of the instrument transformer 1 measures current and/or voltage in between the high voltage terminals 8. Transferred via active parts as for example a discharge pipe and/or VT primary, secondary windings and VT core, measuring results can be recorded and/or read from meters within terminal boxes 5 particularly arranged at the base 4.

The active part is electrically insulated by an isolation material from the housing of the instrument transformer. In the state of the art kraft paper sheets are used as isolation material. The whole active part or parts of the active part are wrapped by kraft paper and the housing is filled by oil, to electrically insulate active parts. Oil impregnates the kraft paper and improves isolation properties. The active part is covered by kraft paper in form of isolator tape respectively sheets wrapped around the active part, which absorbs oil. The oil is for example transformer oil 10, comprising mineral oil.

Wrapping or taping of active parts with kraft paper sheets is manually done, leading to an expensive and time-consuming production process. Due to complex shapes of active parts like the measuring assembly 11, an automation of taping procedures is difficult and expensive. Handmade taping is fault-prone and needs high accuracy. Faults can lead to short currents and complete failure of the instrument transformer 1, particularly irreversible damage of the instrument transformer 1.

Figure 2:
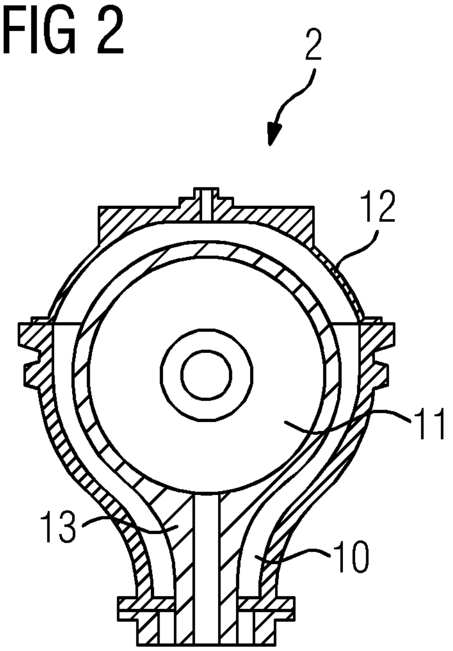
FIG. 2 illustrates in section view the head 2 of instrument transformer 1 of FIG. 1 according to the state of the art.

In FIG. 2 the head 2 of the instrument transformer 1 of FIG. 1 is shown in section view. Kraft paper in form of insulator tape 13 is wrapped around the measuring assembly 11 resulting in an isolator shell around the active part, which is impregnated by oil, particularly transformer oil 10 filled in the housing of the instrument transformer 1. Space between the housing and the active part with kraft paper wrapped, is filled up with oil after assembling. The housing of the instrument transformer 1 is airtight, except an excess pressure outlet. High currents during operation of the instrument transformer produce waste heat, increasing the temperature of oil and leading to high pressure within the instrument transformer 1. Excess pressure and/or oil can dissipate via the excess pressure outlet in an upward direction, to prevent destruction and/or explosion of the instrument transformer 1 and/or injuries of service workforce.

As described above, wrapping active parts of the instrument transformer 1 with isolator tape respectively sheets of kraft paper is time and cost intensive, and fault-prone. In the state of the art wrapping is done handmade, an automation is difficult. Wrapping of active parts before assembling the instrument transformer 1 leads to free space between wrapped parts and the housing, which is filled by oil. Space in between active parts like the measuring assembly 11 and the housing, particularly the head housing 12, cannot be effectively used for isolation by kraft paper, since production tolerances and an assembling of instrument transformer parts lead to free space to be filled by oil.

Figure 3:
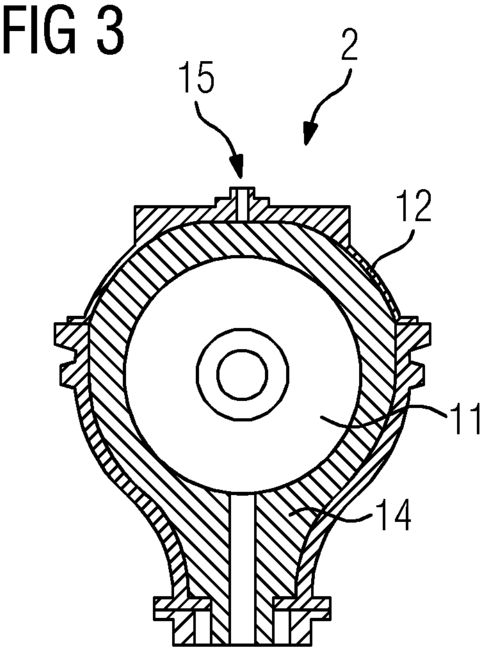
FIG. 3 illustrates in section view the head 2 of an instrument transformer 1 according to the present invention, with paste and/or pulp 14 as insulation material for the active part.

In FIG. 3 the head 2 of an instrument transformer 1 according to the present invention is shown in section view, with paste and/or pulp 14 as insulation material for the active part. The instrument transformer 1 in FIG. 3 is as for FIG. 1 and FIG. 2 described, except the wrapping of active parts with kraft paper in form of isolator tape 13. Instead free space between the housing and active parts is filled by paste and/or pulp 14 of isolation material, particularly comprising a solvent with solved particles, particularly powder of more than 80% wt. partly and/or fully dissolved in less than 20% wt. solvent. Particles comprise for example paper material, and/or cellulose, and/or silicon, and are for example in spherical form, and/or particles are for example in fibrous form, particularly with a size in the range of micro- and/or nano-meter, partly and/or fully dissolved in solvent.

The solvent comprises for example at least one ionic liquid, particularly 1-butyl-3-methylimidazolium chloride [$C_4$mim]Cl, N-methylmorpholine oxide (NMMO), N,N-dimethylacetamide/lithium chloride (DMAc/LiCl), 1,3-dimethyl-2-imidazolidinone/lithium chloride (DMI/LiCl), N,N-dimethylformamide/nitrous tetroxide (DMF/N2O4), dimethyl sulfoxide (DMSO)/tetrabutyl-ammonium fluoride (TBAF), imidazolium phosphates and/or phosphonates, particularly [$C_2$mim](MeO)$_2$PO$_2$, [$C_2$mim]-(MeO)MePO$_2$, and [$C_2$mim](MeO)HPO$_2$, 1-butyl-3-methylimidazolium acetate [$C_4$mim]OAc, 1-ethyl-3-methylimidazolium acetate [C2mim]OAc, 1-(3,6,9-trioxadecyl)-3-ethylimidazolium acetate [Me(OEt)3-Et-Im]OAc, and/or molten salt hydrates, particularly $LiClO_4 \cdot 3H_2O$ and/or $LiSCN \cdot 2H_2O$.

The particles 14 are composed of or comprise paper material, and/or cellulose, and/or silicon. These materials show good dielectric properties, particularly good electrical isolation properties. To improve the isolation properties, paste and/or pulp 14 comprises as insulating fluid oil 10, particularly mineral oil and/or synthetic oil, and/or ester, particularly vegetable esters. Alternatively, the fluid comprises a gas, for example synthetic air and/or $SF_6$. The portion of solvent in the paste and/or pulp 14 is reduced and/or exchanged by insulating fluid for a further increase in electrical isolation. Paste and/or pulp 14 can be in form of or comprise a gel, for easy handling during production.

Particles in the paste and/or pulp 14 are for example in spherical form and/or in fibrous form. The described form allows a high fill factor and a high surface to volume ratio of particles, for example at least two times, particularly at least ten times higher than for the same material in form of sheets. It can further allow a good solution and/or dissolution, resulting in a paste and/or pulp easy to fill in and/or handle, particularly in gel form. A high surface to volume ratio improves impregnation with for example oil and increases with a high fill factor isolation properties.

Paste and/or pulp 14 is filled into the housing for example through a paste/pulp filler inlet 15. The filling process can be fully automated, saving time, cost and reducing faults in the isolation of active parts of the instrument transformer 1. A portion of solvent in the paste and/or pulp 14 is reduced and/or solvent in the paste and/or pulp 14 is exchanged by an insulating fluid, particularly oil 10, particularly mineral oil and/or synthetic oil, and/or ester, particularly vegetable esters, before or after filling into the housing. After filling into the housing can allow to change properties of the paste/pulp, reducing its viscosity and handling properties but increasing the isolation properties. Alternatively or additional reduction of solvent in the paste and/or pulp 14 done before filling paste/pulp into the housing, can increase handling and/or filling properties of the paste/pulp and/or make the exchange process easier. With time a paste/pulp can coagulate, consolidate and/or solidify, or stay fluidic. The isolation material made of, respectively comprising paste/pulp 14, particularly solved particles in solvent and/or oil, results in a good electrical isolation of active parts towards the housing of the instrument transformer 1.

The above described embodiments of the present invention can be used also in combination and combined with embodiments known from the state of the art. For example, the instrument transformer 1 can be a current transformer, an inductive voltage transformer, a capacitive voltage transformer, a combined current and voltage transformer, a power voltage transformer, and/or an optical current transformer. Active parts can be located in a head housing 2, in an isolator 3 and/or in a base 4. A measuring assembly 11 is for example in the head housing 2 arranged. Alternative instrument transformer designs comprise an isolator 3 and a base 4 without a head housing, for example with measuring assembly 11 arranged in the base 4.

Paste/pulp 14 of isolation material comprises paper material, and/or cellulose, and/or silicon or combinations of these materials. Alternative isolator materials in form of particles can be used too, particularly oil solvable materials like plastics and/or porous materials like zeolite, and/or materials like silicon oxide. Paste/pulp 14 can be of spherical form, porous and/or fibrous. An impregnation of particles 14 for example with oil or an exchange of oil and solvent can be done before filling the paste/pulp 14 into the instrument transformer 1 or after filling the paste/pulp 14 into the instrument transformer 1. The insulating fluid can be or can comprise oil, particularly mineral oil and/or a synthetic oil, and/or ester, particularly vegetable esters, or gas, for example clean air and/or $SF_6$. Paste/pulp 14 can be degassed.

The isolation material with paste/pulp 14 can be arranged in the housing, particularly the head housing 12 and/or isolator 3 and/or base 4. The isolation material can consist of paste/pulp 14. Alternatively, the isolation material can consist of and/or comprise paste/pulp 14 and paper sheets in combination, particularly kraft paper sheets. The isolation material can be arranged between the housing and active parts, particularly the measuring assembly 11 and the housing, to electrically isolate parts from each other. The isolation material consisting of paste/pulp 14 can be arranged in the head housing 12 and/or isolation material consisting of paper sheets can be arranged in the isolator 3. In an alternative arrangement, the isolation material consisting of paste/pulp 14 can be arranged in the isolator 3 and/or isolation material consisting of paper sheets can be arranged in the head housing 12. In the isolator 3 all free space can be filled with isolation material or only parts, particularly field electrodes and/or electrical conductors, particularly in tube form, are filled and or wrapped and/or coated with isolation material. In the head housing 12 all free space can be filled with isolation material.

LIST OF REFERENCE CHARACTERS

1 instrument transformer
2 head
3 isolator
4 base
5 terminal box
6 bellow cover
7 oil level indicator
8 high voltage terminals
9 high voltage insulation
10 transformer oil

11 measuring assembly, particularly secondary core/windings
12 head housing
13 isolator tape, kraft paper
14 paste/pulp
15 paste/pulp filler inlet

The invention claimed is:

1. An instrument transformer for at least one of high current or high voltage conversion, the instrument transformer comprising:

a housing;

at least one active part; and an isolation material electrically insulating said at least one active part, said isolation material including or being a paste;

said paste including a solvent with dissolved particles of powder forming more than 80 wt % of said paste;

said particles being partly dissolved in less than 20 wt % of said solvent, and said particles including at least one of paper material or cellulose.

2. The instrument transformer according to claim 1, wherein said paste particles have a size in at least one of a micrometer or nanometer range.

3. The instrument transformer according to claim 2, wherein said particles are at least one of spherically-shaped or fibrous.

4. The instrument transformer according to claim 1, wherein said a solvent is at least one of ionic liquid or 1-butyl-3-methylimidazolium chloride [$C_4$mim]Cl, N-methylmorpholine oxide (NMMO), N,N-dimethylacetamide/lithium chloride (DMAc/LiCl), 1,3-dimethyl-2-imidazolidinone/lithium chloride (DMI/LiCl), N,N-dimethylformamide/nitrous tetroxide (DMF/N2O4), dimethyl sulfoxide (DMSO)/tetrabutyl-ammonium fluoride (TBAF), imidazolium phosphates or phosphonates or [$C_2$mim](MeO)$_2$PO$_2$, [$C_2$mim]-(MeO)MePO$_2$, or [$C_2$mim](MeO)HPO$_2$, 1-butyl-3-methylimidazolium acetate [$C_4$mim]OAc, 1-ethyl-3-methylimidazolium acetate [C2mim]OAc, 1-(3,6,9-trioxadecyl)-3-ethylimidazolium acetate [Me(OEt)3-Et-Im]OAc, or molten salt hydrates or $LiClO_4 \cdot 3H_2O$ or $LiSCN \cdot 2H_2O$.

5. The instrument transformer according to claim 4, wherein a portion of said solvent in said paste is reduced by an insulating fluid.

6. The instrument transformer according to claim 1, wherein said paste includes an insulating fluid being oil.

7. The instrument transformer according to claim 6, wherein said oil is at least one of mineral oil or synthetic oil or ester oil or vegetable ester oil.

8. The instrument transformer according to claim 1, wherein said paste with said isolation material is disposed in said housing.

9. The instrument transformer according to claim 1, which further comprises a head housing, an isolator and a base, said paste with said isolation material being disposed in said head housing and said isolator and said base or being disposed between said housing and said at least one active part.

10. The instrument transformer according to claim 9, wherein said at least one active part is a measuring assembly.

11. The instrument transformer according to claim 10, wherein said paste with said isolation material completely fills in a space between said housing or said head housing and said isolator and said base and said at least one active part or said measuring assembly.

12. A method for producing an instrument transformer, the method comprising filling the housing of the instrument transformer according to claim 1 with said paste dissolved in said solvent.

13. The method according to claim 12, which further comprises providing at least one ionic liquid as said solvent.

14. The method according to claim 12, which further comprises reducing a portion of said solvent in said paste with an insulating fluid or oil.

15. The method according to claim 14, which further comprises providing the oil as at least one of mineral oil or synthetic oil or ester oil or vegetable ester oil.

16. The method according to claim 12, which further comprises filling said isolation material with said paste into said housing.

17. The method according to claim 16, which further comprises carrying out the filling after degassing.

18. The method according to claim 16, which further comprises using said isolation material in said housing to electrically insulate said active parts of the instrument transformer from said housing.

19. The method according to claim 18, which further comprises providing a measuring assembly as the instrument transformer.

* * * * *